(12) United States Patent
Dischler

(10) Patent No.: US 6,354,634 B1
(45) Date of Patent: Mar. 12, 2002

(54) COUPLING DEVICE FOR JOINING PIPES

(75) Inventor: Helmut Dischler, Neuss (DE)

(73) Assignee: Novopress GmbH Pressen und Presswerkzeuge & Co. KG (DE)

( * ) Notice: Subject to any disclaimer, the term of this patent is extended or adjusted under 35 U.S.C. 154(b) by 0 days.

(21) Appl. No.: 09/242,563

(22) PCT Filed: Aug. 9, 1997

(86) PCT No.: PCT/EP97/04349

§ 371 Date: Dec. 8, 1999

§ 102(e) Date: Dec. 8, 1999

(87) PCT Pub. No.: WO98/08017

PCT Pub. Date: Feb. 26, 1998

(30) Foreign Application Priority Data

Aug. 21, 1996 (DE) .......................... 196 33 627

(51) Int. Cl.[7] .................................. F06L 21/00
(52) U.S. Cl. .................. 285/231; 285/331; 285/232
(58) Field of Search ............ 285/231, 49, 97, 285/331, 187, 232, 224, 374, 252, 253

(56) References Cited

U.S. PATENT DOCUMENTS

| | | | |
|---|---|---|---|
| 1,786,720 A | * 12/1930 | Morre et al. | |
| 1,817,774 A | * 8/1931 | Sipe | |
| 2,032,492 A | * 3/1936 | Nathan | |
| 2,448,769 A | 9/1948 | Chamberlain | 285/193 |
| 2,451,070 A | * 10/1948 | Chamberlain | |
| 3,226,137 A | * 12/1965 | Trnka | |
| 3,420,554 A | * 1/1969 | Straub | 285/97 |
| 4,198,078 A | * 4/1980 | Herbert | |
| 4,293,138 A | * 10/1981 | Swantee | |
| 4,427,219 A | * 1/1984 | Madej | |

FOREIGN PATENT DOCUMENTS

| | | | |
|---|---|---|---|
| DE | 807575 | 7/1951 | |
| DE | 1187870 | 1/1965 | |
| DE | 1965422 | * 7/1970 | ................. 285/331 |
| DE | 1945362 | 9/1973 | |
| DE | 2408801 | 9/1974 | |
| DE | 3310027 | 4/1984 | |
| DE | 9016310 | 4/1991 | |
| DE | 4137495 | 5/1993 | |
| EP | 0361630 | 10/1992 | |
| EP | 0582543 | 2/1994 | |
| FR | 2450990 | 10/1980 | |
| GB | 556010 | * 9/1943 | ................. 285/97 |
| GB | 870952 | 6/1961 | |
| GB | 1213786 | 11/1970 | |
| RU | 1592625 | * 9/1990 | ................. 285/331 |
| WO | 9424475 | 10/1994 | |

OTHER PUBLICATIONS

Patent Abstracts of Japan, Publ. No. 08004954 A, Dec. 1, 1996.

* cited by examiner

*Primary Examiner*—Teri Pham Luu
(74) *Attorney, Agent, or Firm*—Liniak, Berenato, Longacre & White L

(57) ABSTRACT

A coupling device for joining pipe ends has at least one pressing sleeve which can be slipped on a pipe end and pressed together with the pipe end. The pressing sleeve is elastically designed in the area of its inner surface pressed on the pipe end so that an expansion of the pipe end caused by temperature variations can be absorbed by elastic shear deformation of the elastic area, without causing the pipe end to slide in the pressing sleeve.

34 Claims, 4 Drawing Sheets

COUPLING DEVICE FOR JOINING PIPES

The invention concerns a pipe arrangement having two pipes joined at their ends by way of a coupling device.

Coupling devices of this kind for joining pipe ends are available in a variety of embodiments.

For example, it is known to use, for the joining of pipes, sleeve-shaped press fittings which for purposes of creating a pipe join are slid over the pipe ends and then radially pressed together, both the press fitting and the pipe being plastically deformed. Pipe joins of this kind and the associated press fittings are described, for example, in DE-C-11 87 870 and EP-B-0 361 630.

It is furthermore known, from DE-A-33 10 027, to equip the pipe ends with conical indentations in order to increase the retention forces by way of the resulting wedge effect.

In addition, special coupling devices are used in which the two pipe ends are clamped in annular spaces which are formed between an internal support sleeve and an external pressing sleeve surrounding the latter and made of metal. In this context, the pipe ends are fastened in the coupling device by the fact that the pressing sleeve is pressed radially inward, resulting in plastic deformation and in clamping of the pipe ends between the pressing sleeve and support sleeve.

It is possible in this context to allocate a separate pressing sleeve to each pipe end, as is known from DE-U-90 16 310; or to use a single, continuous pressing sleeve as proposed in EP-A-0 582 543.

The known coupling devices have proven entirely successful in practice. They are often problematic to use, however, if they are exposed during operation to large temperature fluctuations, since large forces can then act on the join due to temperature-related expansions of the pipe and coupling device. In the case of coupling devices which are used to join synthetic-resin pipes in hot-water lines, for example, the operating temperature fluctuates in the range from 20 to 100 degrees C., and temperature changes of this kind result in length changes in the pipes of approximately 20 mm per meter of pipe length. The metal coupling devices expand very little by comparison, so that the join is exposed to large constraining forces, which can cause the pipe ends to slip in the coupling device and can cause the join to leak.

In order to counteract this problem, it is proposed in GB-A-1 213 786 to equip the pipes with bellows-like regions which absorb the length changes of the pipe and are thus intended to relieve the load on the connecting point. Provision is also made, in the annular space between two pipe ends inserted into one another, for a sealing element which is capable of at least partially compensating for radial expansions. Thermal expansions can partially be compensated for with this embodiment, but this achieved at the cost of the disadvantage that in order to adapt to the temperature differences which occur and to the overall pipe length by which the resulting expansions are determined, the pipes must possess different bellows regions. In other words, a large variety of pipes is required, which entails a large outlay.

It is therefore the object of the invention to create a pipe arrangement which easily guarantees reliable and leakproof joining of two pipe ends even in the presence of large temperature fluctuations.

According to the present invention, this object is substantially achieved by a pipe arrangement having at least two pipes joined at their ends by way of a coupling device, the coupling device having at least one pressing sleeve slid onto the pipe end and press-joined to the pipe end, and there being provided between the pressing sleeve and pipe end an elastic region which possesses an elasticity, and is configured, such that thermal axial and radial expansions of the pipe end occurring during operation are absorbed by elastic deformation of the elastic region, without slippage of the pipe end in the pressing sleeve.

With this pipe arrangement expansions of the pipe resulting from temperature changes or other stresses are thus absorbed by the elastic region, which is configured in elastic fashion such that it can deform in accordance with the pipe expansion which occurs without impairing the nonpositive join between the pressing sleeve and the respective pipe end. In this context, the elastic region should be configured so that both thickness changes and length changes of the pipe end pressed into the coupling device can be absorbed.

Advantageously, the elastic region is configured so that the tensile and transverse elasticity increases in the direction of the free end of the pressing sleeve. As a result of this feature, the deformation behavior of the elastic region corresponds to the longitudinal expansion behavior of a pipe retained in the coupling device, so that expansion of the pipe is greatest in the region of the free end of the pressing sleeve, and is practically nonexistent at its axial end inserted into the pressing sleeve, since the longitudinal forces have already been absorbed by then.

In order to achieve a transverse elasticity which increases in this fashion, it is possible to provide, in the surface of the elastic region facing the pipe end, slits extending in the circumferential direction, whose depth and/or breadth increases in the direction of the free end of the pressing sleeve.

According to one embodiment of a pipe arrangement according to the present invention, the pressing sleeve is constituted by a plastically deformable outer sleeve, which for example can be made of metal, and an elastically deformable annular element, held in the outer sleeve, which is hereinafter referred to as the "inner sleeve" even though it does not have the rigidity of a sleeve in the conventional sense. The inner sleeve is advantageously made, like the pipes, of synthetic resin. This ensures that the pipe end and the inner sleeve deform to approximately the same extent.

In a further embodiment of the invention, the outer sleeve and the inner sleeve can also be of conical configuration, so that the inner sleeve can be slid into the outer sleeve from the free end of the pressing sleeve, and the inner sleeve can additionally be pressed into the outer sleeve while elastically deforming a spring element, in order to create the necessary press-join between the pressing sleeve and pipe end. This creates a detachable join, since the outer sleeve does not need to be plastically deformed.

The inner sleeve can also be constituted by a plurality of inner sleeve elements axially adjacent to one another and provided separately from one another. The inner sleeve elements then advantageously have a T- or L-shaped cross section, thus forming slits that are open toward the pipe end when they are axially lined up with one another. The individual inner sleeve elements can be made, for example, of metal.

According to a further embodiment, the pressing sleeve comprises an elastically deformable synthetic-resin element with plastically deformable fibers or annular elements, made of metal or synthetic resin, embedded therein. In this case the pressing sleeve is configured as an injection-molded part so that it is easy to manufacture. The desired elasticity of the pressing sleeve is attained by way of the synthetic resin, while fastening of a pipe end is accomplished by way of the fibers or rings, by pressing then inward accompanied by plastic deformation, thereby press-joining the pipe end and pressing sleeve to one another.

With this embodiment, the desired increase in longitudinal or transverse elasticity in the direction of the free end of the pressing sleeve can be attained by the fact that the pressing sleeve has a wall thickness which decreases toward its free end. Alternatively or additionally, slits can provided in this case as well in the inner surface of the pressing sleeve, to increase the elasticity.

In a manner known per se, there can be provided inside the pressing sleeve a support sleeve which forms with the pressing sleeve an annular receptacle for a pipe end. The support sleeve can also be configured elastically in the region of its outer surface coming into contact with the pipe end, so that it can absorb expansions of the pipe end by elastic deformation. For example, the pressing sleeve and support sleeve can be manufactured integrally as a synthetic resin part with plastically deformable fibers or rings embedded therein. In addition, both the support sleeve and the pressing sleeve can have a wall thickness which decreases toward their free end, and can have slits on their outer surface.

Alternatively, the pressing sleeve can be divided in its circumferential direction into several sleeve elements, which are joined to one another under the elastic preload of spring elements in such a way that the pressing sleeve can expand radially against the preload of the spring elements, and which are configured resiliently in the axial direction. With this embodiment, the desired elasticity for absorbing temperature-related expansions of the pipe end is achieved by the spring elements that are provided, and by the resilient configuration of the pressing sleeve. Advantageously, the sleeve elements are elastically compressed by compression spring elements, and in the axial direction have radial protrusions which can be elastically compressed and stretched.

According to a further embodiment, the pressing sleeve is made of an elastically deformable material and has a cavity which can be filled with pressing fluid in order to press-join the pressing sleeve to a pipe end by expanding the pressing sleeve. Alternatively, it is possible to provide in the cavity a powdered medium which upon excitation, in particular upon ignition or reaction with water, reacts by expanding and by spreading apart the pressing sleeve. The spreading of the pressing sleeve results here in the press-join between the pipe end and pressing sleeve. Advantageously, the pressing sleeve is surrounded by a fixed reinforcement sleeve, so that expansion of the pressing sleeve takes place substantially radially inward toward the pipe end that is to be fastened.

Regarding further advantageous embodiments of the invention, reference is made to the dependent claims and to the description below of exemplify embodiments which refer to the attached drawings, in which:

In all cases, the depictions show only one joining region between a pressing sleeve and a pipe end of a coupling device. The other joining region for receiving a second pipe end is of identical configuration here.

Figure 1:
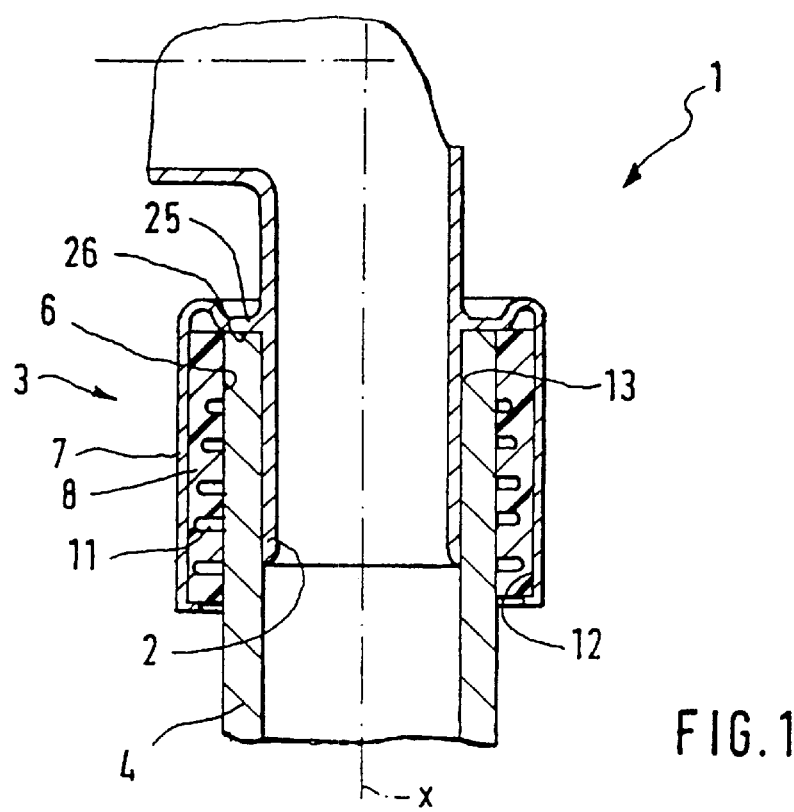
FIG. 1 shows in section a first pipe arrangement according to the invention, with a pipe end which is depicted in the left half in the unpress-joined state and in the right half in the press-joined state.

The pipe arrangement depicted in FIG. 1 comprises a coupling device 1 having a substantially cylindrical support sleeve 2 and an also substantially cylindrical pressing sleeve 3. A pipe end 4, which can be made of synthetic resin or metal, is inserted into the annular space 12 formed between support sleeve 2 and pressing sleeve 3.

Pressing sleeve 3 comprises a plastically deformable outer sleeve 7 and an inner sleeve 8 retained in outer sleeve 7.

Inner sleeve 8 is made of a synthetic resin which is elastically deformable in such a way that radial expansions of pipe end 4 as a result of temperature changes can be absorbed by elastic deformation of inner sleeve 8, and longitudinal expansions of pipe end 4 can be absorbed by transverse deformation or by longitudinal elasticity, without causing pipe end 4 to slip in pressing sleeve 3.

In its inner surface 6 which comes into contact against pipe end 4, inner sleeve 8 has a plurality of slits 11 which are located next to one another in axial direction X of pressing sleeve 3, and extend over the entire periphery of pressing sleeve 3. Slits 11 are provided in order to increase the elasticity of inner sleeve 8 and in particular to create open spaces into which the synthetic-resin material of inner sleeve 8 can escape in the event of a deformation. The depth and/or width of slits 11 becomes gradually larger from the preferably axial end of pipe 4 toward the free end of pressing sleeve 3.

The facilitating result of this is that the transverse elasticity of inner sleeve 8 is greatest at the free end of pressing sleeve 3, where the most pronounced longitudinal expansions of pipe end 4 occur.

Outer sleeve 7 is joined to support sleeve 2 via a connecting web 25 which forms a stop surface 26 for pipe end 4 and inner sleeve 8 and can transfer the pipe forces which occur, as well as contributing to sealing. To fasten pipe end 4 in coupling device 1, pressing sleeve depicted in the left half of FIG. 1 is pressed radially inward, accompanied by plastic deformation of its outer sleeve 7; inner sleeve 8 is elastically deformed, causing slits 11 to become smaller, as shown in the right half of FIG. 1. The preloading of inner sleeve 8 generated thereby ensures secure retention of pipe end 4 in coupling device 1.

The inner sleeve can also be constituted by a plurality of inner sleeve elements axially adjacent to one another and provided separately from one another. The inner sleeve elements then advantageously have a T- or L-shaped cross section, so that slits open toward the pipe end are formed when they are axially lined up with one another. The individual inner sleeve elements can be made, for example, of metal.

When hot water, for example, flows through pipe 4 during operation, pipe 4 expands considerably in both its length and its thickness. These temperature-related expansions are compensated for in coupling device 1 by an elastic deformation of inner sleeve 8, with no slippage of pipe end 4 in coupling device 1.

Figure 2:
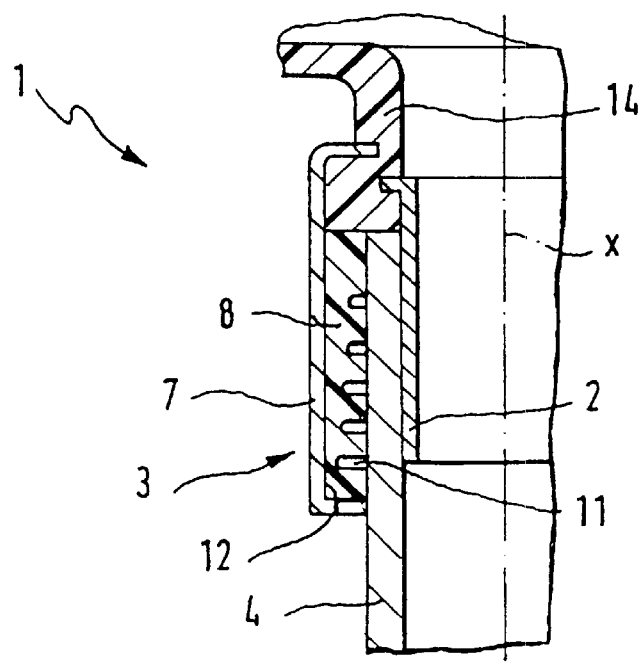
FIG. 2 shows the left half of a second pipe arrangement in the press-joined state.

Coupling device 1 depicted in FIG. 2 corresponds substantially to the coupling device depicted in FIG. 1, and comprises a support sleeve 2 and a pressing sleeve 3 which form between them an annular space 12 into which a pipe end 4 is slid. Pressing sleeve 3 comprises an elastically deformable inner sleeve 8, enclosing pipe end 4, which has slits 11 in its inner surface 6 resting against pipe end 4; and a plastically deformable outer sleeve 7, surrounding inner sleeve 8, made of metal.

In this embodiment, support sleeve 2 and outer sleeve 7 are configured as separate components which are insert-molded at their one axial end into a coupling element 14 made of synthetic resin.

Fastening of pipe end 4 in coupling device 1 is accomplished, as with the embodiment depicted in FIG. 1, by pressing outer sleeve 7 radially inward to cause plastic deformation over its entire circumference, so that inner sleeve 8 elastically deforms, thus clamping pipe end 4 under preload between inner sleeve 8 and support sleeve 2.

Alternatively, outer sleeve 7 and/or support sleeve 2 can be made of a so-called "memory material," i.e. an alloy with shape memory, which when subjected to predefined heating permanently expands or contracts in such a way that a pipe end 4 inserted into annular space 12 is clamped between sleeves 2, 7 while inner sleeve 8 deforms elastically.

Figure 3:
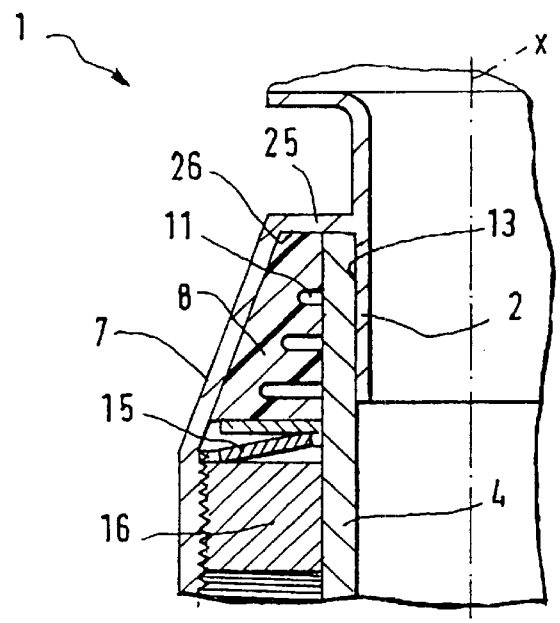
FIG. 3 shows the left half of a third pipe arrangement.

FIG. 3 depicts a third pipe arrangement 1. In this, pressing sleeve 3 is again constituted by an outer sleeve 7 joined to support sleeve 2, and an inner sleeve 8 inserted between the pipes and outer sleeve 7. Outer sleeve 7 and inner sleeve 8 are here each of conical configuration, so that inner sleeve 8 can be inserted in wedge fashion, from the free end of pressing sleeve 3, into the annular space formed between outer sleeve 7 and pipe end 4, resulting in elastic deformation. There it is retained under preload by a retaining element 16 screwed into outer sleeve 7, with interposition of a compression spring element 15 that is braced between inner sleeve 8 and retaining element 16.

Spring element 15, and the deformation of inner sleeve 8 generated upon insertion into outer sleeve 7, generate sufficient preload to retain pipe end 4 securely in coupling device 1. This arrangement has the advantage that the join between coupling device 1 and pipe end 4 can be undone again by unscrewing retaining element 16 out of outer sleeve 7.

Inner sleeve 8 is once again equipped, on its inner surface 6 resting against pipe end 4, with slits 11 so that the pipe expansion can be dissipated without slippage when longitudinal forces occur in the pipe, and so as to create escape spaces for the greater thermal expansion of synthetic resin as compared to metal.

Compensation for thermal expansions of pipe end 4 is accomplished here in the same manner as in the exemplifying embodiments described above, i.e. by elastic deformation of inner sleeve 8.

Figure 4:
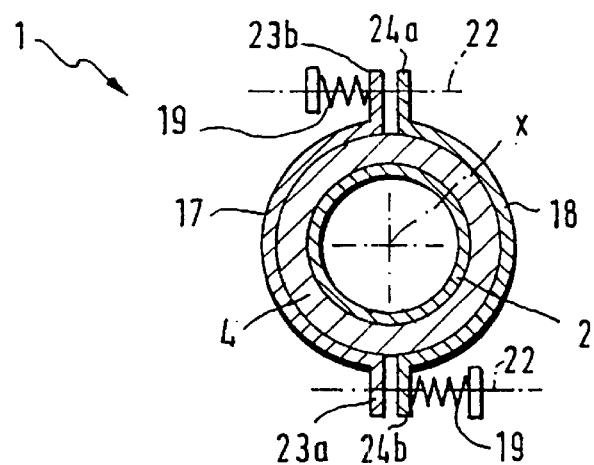
FIG. 4 shows a fourth pipe arrangement in cross section.
Figure 5:
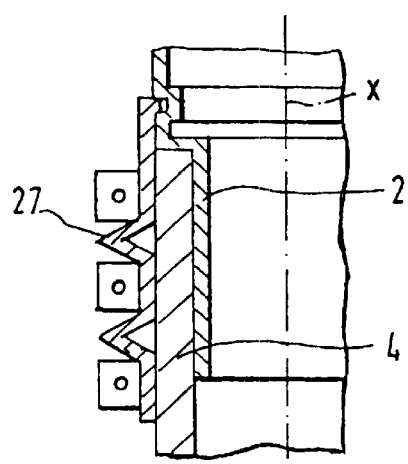
FIG. 5 shows the left half of the pipe arrangement shown in FIG. 4, in longitudinal section.

The coupling device depicted in FIGS. 4 and 5 has a support sleeve 2 and a pressing sleeve 3 which form between them an annular space 12 into which a pipe end 4 is inserted. In this case pressing sleeve 3 is divided in the circumferential direction into two or more sleeve elements 17, 18 which fit around pipe end 4 and are respectively joined at their mutually facing end faces, under the elastic preload of compression spring elements 19, in such a way that pressing sleeve 3 can spread apart radially against the preload of compression spring elements 19.

To create this join, radial flanges 23a, 23b, 24a, 24b associated respectively with one another are provided on the mutually facing sides of sleeve elements 17, 18. A retaining element 22 penetrates in each case through a first of the two flanges 23a, 24a and is attached to second flange 23b, 24b, for example screwed in; compression spring element 19, which presses the two sleeve elements 17, 18, is provided between first flange 23a, 24a and retaining element 22.

Sleeve elements 17, 18 are also, as is evident in particular from FIG. 5, configured resiliently in axial direction X of pipe 4, in order to be able to compensate for longitudinal expansions of pipe end 4; for that purpose they have several radial protrusions 27 configured in the manner of disk springs and arranged at an axial spacing is from one another.

If thermal expansions occur in pipe end 4 during operation, thickness changes in pipe end 4 are compensated for by the fact that sleeve elements 17, 18 are pushed apart against the spring force of spring element 19, and longitudinal expansions are compensated for by the fact that protrusions 27 are stretched or crimped.

Figure 6:
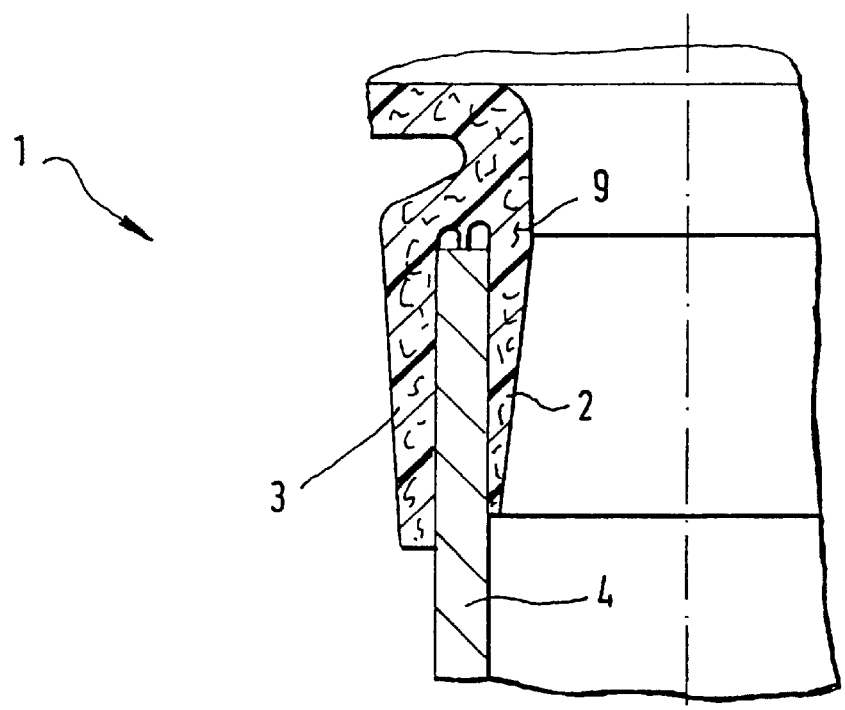
FIG. 6 shows the left half of a fourth pipe arrangement in longitudinal section.
Figure 7:
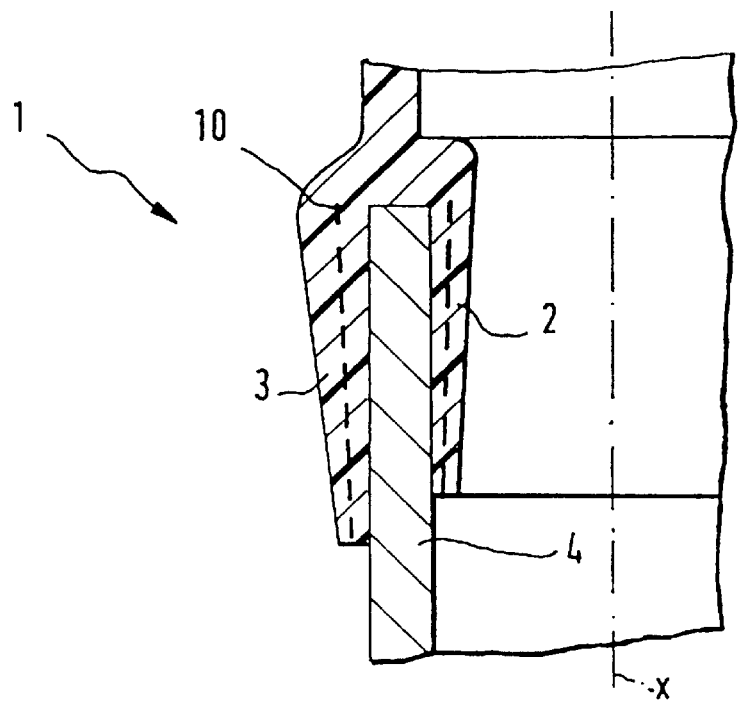
FIG. 7 shows the left half of a sixth pipe arrangement in longitudinal section.

FIGS. 6 and 7 show two further pipe arrangements in which a support sleeve 2 and a pressing sleeve 3 are respectively configured integrally as injection-molded parts. The material selected here for the injection-molded parts is an elastically deformable synthetic resin into which plastically deformable fibers 9 or annular elements 10 are embedded.

Figure 8:
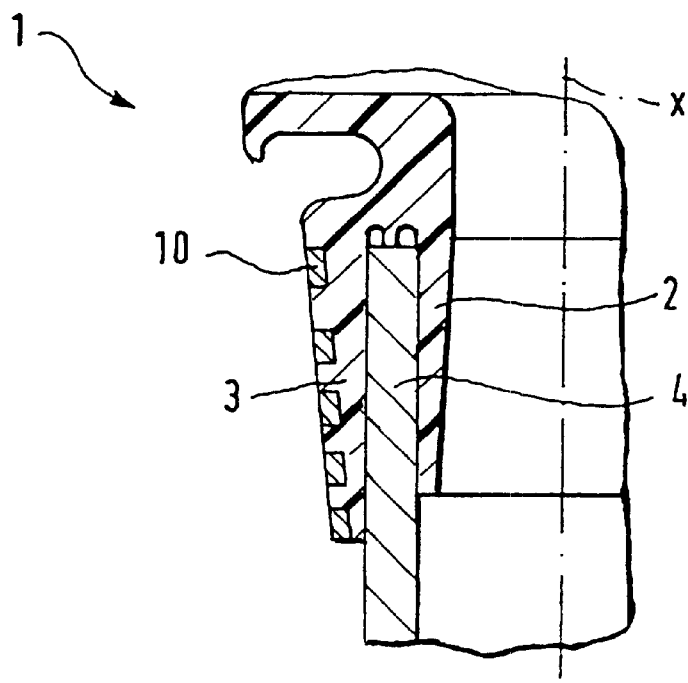
FIG. 8 shows the left half of a seventh embodiment of a pipe arrangement according to the present invention, in longitudinal section.

Alternatively, as in the case of the embodiment depicted in FIG. 8, annular elements 10 can surround pressing sleeve 3 or be set into it externally.

In the case of the coupling devices depicted in FIGS. 6 through 8, in order to fasten pipe end 4 the externally located pressing sleeve 3 is pressed radially inward, accompanied by elastic deformation of the synthetic-resin material and plastic deformation of fibers 9 or annular elements 10, so that pressing sleeve 3 and pipe end 4 are press-joined to one another.

To ensure that pressing sleeve 3 and support sleeve 2 possess, in desired fashion, a transverse elasticity which increases in the direction of their free ends, support sleeve 2 and pressing sleeve possess a wall thickness which decreases in the direction of their free ends.

Once again, in the case of the coupling devices shown in FIGS. 6 through 8, slits can be provided in inner surfaces 6 of pressing sleeve 3 in order to increase the transverse elasticity.

Figure 9:
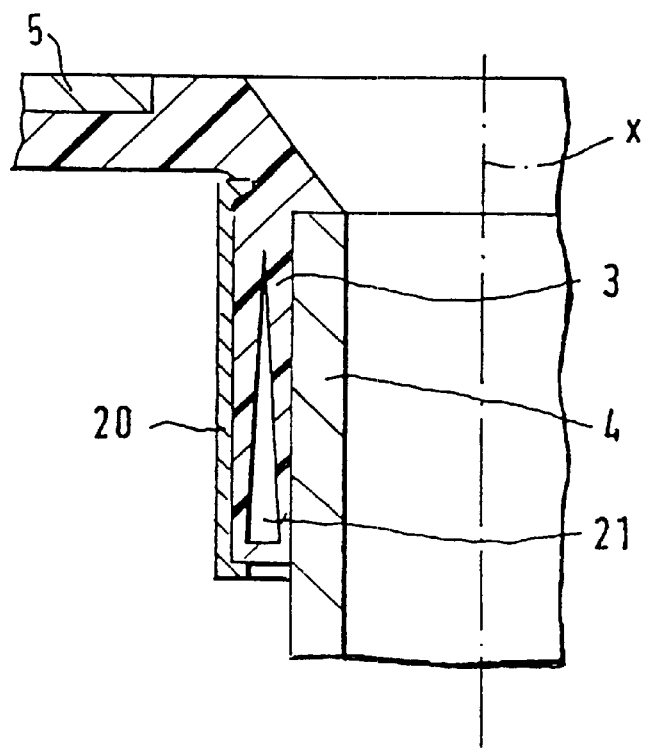
FIG. 9 shows the left half of an eighth embodiment of a pipe arrangement according to the present invention, in longitudinal section.

The coupling device depicted in FIG. 9 does not comprise a support sleeve, but rather only a pressing sleeve 3 which is slid onto a pipe end 4. Pressing sleeve 3 is made of an elastically deformable synthetic-resin material, and has a cavity 21 extending over the entire circumference.

In order to fasten pipe end 4 in the coupling device, cavity 21 is filled with a pressurized fluid so that pressing element 3 expands, resulting a press-join to pipe end 4.

Alternatively, cavity 21 can be filled with, in particular, a powdered material that can be caused to react by ignition or by some other excitation, thus expanding and causing pressing sleeve 3 to spread apart.

Pressing sleeve 3 is surrounded by a reinforcement sleeve 20 which is made of a very strong material, so that the expansion of pressing sleeve 3 occurs practically exclusively radially inward toward pipe end 4.

What is claimed is:

1. A pipe arrangement having at least two pipes joined at their ends by way of a coupling device (1), the coupling device (1) having at least one pressing sleeve (3) slipped onto a pipe end (4, 5) and press-joined to the pipe end (4, 5), and there being provided between the pressing sleeve (3) and pipe end (4, 5) an elastic region which possesses an elasticity, and is configured, such that thermal axial and radial expansions of the pipe end (4, 5) occurring during operation are absorbed by elastic deformation of the elastic region, without slippage of the pipe end (4, 5) in the pressing sleeve (3).

2. The pipe arrangement as defined in claim 1, wherein said pressing sleeve has first and second ends and the elasticity of the elastic region increases in a direction extending toward said first pressing sleeve end.

3. The pipe arrangement as defined in claim 2, wherein in order to increase the elasticity several slits (11), which extend, lying next to one another in the axial direction (X) of the pressing sleeve (3), in its circumferential direction, are provided in the inner surface (6) of the elastic region.

4. The pipe arrangement as defined in claim 3, wherein a depth of the slits (11) increases in a direction extending toward said first pressing sleeve end.

5. The pipe arrangement as defined in claim 3, wherein a width of the slits (11) increases in a direction extending toward said first pressing sleeve end.

6. The pipe arrangement as defined in claim 1, wherein the pressing sleeve (3) has an outer sleeve (7), and an inner sleeve (8) that is retained in the outer sleeve (7), said inner sleeve having an elasticity and constituting the elastic region.

7. The pipe arrangement as defined in claim 6, wherein the outer sleeve (7) and inner sleeve (8) are configured such that the inner sleeve (8) can be slid into the outer sleeve (7) from the free end of the pressing sleeve (3).

8. The pipe arrangement as defined in claim 7, wherein the outer sleeve (7) and inner sleeve (8) are each of conical configuration.

9. The pipe arrangement as defined in claim 7, wherein the inner sleeve (8) can be pressed axially into the outer sleeve (7), accompanied by elastic deformation, in order to create the press-join between pressing sleeve (3) and pipe end (4, 5).

10. The pipe arrangement as defined in claim 9, wherein the inner sleeve (8) is pushed into the outer sleeve (7) by the preload of a spring element (15) that is braced between the inner sleeve (8) and a retaining element (16) screwed from outside into the outer sleeve (7).

11. The pipe arrangement as defined in claim 6, wherein the inner sleeve (8) is constituted by a plurality of inner sleeve elements axially adjacent to one another and separated from one another.

12. The pipe arrangement as defined in claim 11, wherein the inner sleeve elements each possess a T- or L-shaped cross section, so that when said inner sleeve elements are axially lined up with one another, slits are formed in the inner sleeve and open up toward the pipe end.

13. The pipe arrangement as defined in claim 11, wherein the inner sleeve elements are made of metal.

14. The pipe arrangement as defined in claim 6, wherein the inner sleeve (8) is made of elastically deformable synthetic resin.

15. The pipe arrangement as defined in claim 1, wherein the elastic region of the pressing sleeve (3) has an elastically deformable synthetic-resin element having plastically deformable annular elements (10), made of metal or synthetic resin, embedded therein.

16. The pipe arrangement as defined in claim 15, wherein the annular elements (10) are embedded into the outer surface of the synthetic-resin element.

17. The pipe arrangement as defined in claim 1, wherein the elastic region of the pressing sleeve (3) has an elastically deformable synthetic-resin element having plastically deformable fibers (9), made of metal or synthetic resin, embedded therein.

18. The pipe arrangement as defined in claim 17, wherein the synthetic-resin element has a wall thickness which decreases in the direction of the free end of the pressing sleeve (3).

19. The pipe arrangement as defined in claim 1, wherein there is provided inside the pressing sleeve (3) a support sleeve (2) which forms, with the pressing sleeve (3), an annular receptacle (12) for a pipe end (4, 5).

20. The pipe arrangement as defined in claim 19, wherein the pressing sleeve (3) and the support sleeve (2) are immovably joined to one another.

21. The pipe arrangement as defined in claim 20, wherein the pressing sleeve (3) and support sleeve (2) are configured integrally as an elastic synthetic-resin part having fibers (9), made of plastically deformable metal or synthetic resin embedded therein.

22. The pipe arrangement as defined in claim 21, wherein the support sleeve (2) has a wall thickness which decreases in the direction of its free end.

23. The pipe arrangement as defined in claim 20, wherein the support sleeve (2) and an outer sleeve (7) of the pressing sleeve (3) are insert-molded at their one axial end into a coupling element (21) made of synthetic resin.

24. The pipe arrangement as defined in claim 23, wherein the support sleeve (2) and the outer sleeve (7) are made of a memory metal, the elastic region being between the outer sleeve (7) and the pipe end.

25. The pipe arrangement as defined in claim 20, wherein the pressing sleeve (3) and support sleeve (2) are configured integrally as an elastic synthetic-resin part having annular elements (10), made of plastically deformable metal or synthetic resin embedded therein.

26. The pipe arrangement as defined in claim 19, wherein there are provided, in the outer surface (13) of the support sleeve (2) which comes into contact with one pipe end (4, 5), several slits which, in order to increase the elasticity, are arranged next to one another in the axial direction (X) of the pressing sleeve (3), and extend in its circumferential direction.

27. The pipe arrangement as defined in claim 26, wherein the depth of the slits increases in the direction of the free end of the support sleeve (2).

28. The pipe arrangement as defined in claim 26, wherein the width of the slits increases in the direction of the free end of the support sleeve (2).

29. The pipe arrangement as defined in claim 1, wherein the pressing sleeve (3) is made of an elastically deformable material and the elastic region has a cavity (19) that, in order to press-join the pressing sleeve (3) to a pipe end (4, 5), can be filled with a pressing fluid to expand the pressing sleeve (3).

30. The pipe arrangement as defined in claim 29, wherein the pressing sleeve (3) is surrounded by a solid reinforcement sleeve (20) so that any expansion of the pressing sleeve (3) occurs substantially radially inward toward the pipe end (4, 5).

31. The pipe arrangement of claim 1, wherein the pressing sleeve (3) is made of an elastically deformable material and the elastic region has a cavity (21) that is filled, in particular, with a powdered medium which upon excitation, in particular by ignition or reaction with water, reacts upon expanding and by spreading apart the pressing sleeve (3).

32. A pipe arrangement having at least two pipes joined at their ends by way of a coupling device (1), the coupling device (1) having at least one pressing sleeve (3) slipped onto a pipe end (4, 5) and press-joined to the pipe end (4, 5), and having elastic spring elements, the pressing sleeve (3) being divided in its circumferential direction into several sleeve elements (17, 18), each of the sleeve elements (17, 18) being joined to one another by the spring elements (19) in such a way that the pressing sleeve (3) can spread apart radially against a biasing force of the spring elements (19) such that thermal axial and radial expansions of the pipe end (4, 5) occurring during operations are absorbed by elastic deformation of the spring elements, without slippage of the pipe end (4, 5) in the pressing sleeve (3).

33. The pipe arrangement as defined in claim 32, wherein the sleeve elements (17, 18) are elastically compressed by compression spring elements (19).

34. The pipe arrangement as defined in claim 32, wherein the sleeve elements (17, 18) have elastically stretchable and compressible radial protrusions (27), arranged at an axial spacing from one another, in order to create a resiliency and an elasticity in the axial direction.

* * * * *